(12) United States Patent
Lawlor (10) Patent No.: US 8,931,386 B2
(45) Date of Patent: Jan. 13, 2015

(54) MITER SAW WITH BEVEL LOCK

(75) Inventor: Michael J. Lawlor, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 1056 days.

(21) Appl. No.: 12/977,408

(22) Filed: Dec. 23, 2010

(65) Prior Publication Data

US 2012/0160073 A1   Jun. 28, 2012

(51) Int. Cl.
 *B23D 45/14* (2006.01)
 *B23D 45/04* (2006.01)
 *B27B 5/29* (2006.01)

(52) U.S. Cl.
 CPC ............... *B27B 5/29* (2013.01); *B23D 45/044* (2013.01)
 USPC ............................... 83/471.3; 83/477; 83/581

(58) Field of Classification Search
 USPC ............. 83/471.3, 477, 581, 477.1, 471, 472, 83/473, 477.2, 486.1, 699.61, 485, 487, 83/165, 78
 See application file for complete search history.

(56) References Cited

U.S. PATENT DOCUMENTS

| | | | |
|---|---|---|---|
| 6,067,885 A | 5/2000 | Brunson et al. | |
| 6,474,207 B1 * | 11/2002 | Itzov | 83/471.3 |
| 7,013,781 B2 * | 3/2006 | Brunson et al. | 83/471.3 |
| 7,530,297 B2 * | 5/2009 | Carroll et al. | 83/471.3 |
| 2004/0089125 A1 | 5/2004 | Schoene et al. | |
| 2005/0211038 A1 * | 9/2005 | Imamura et al. | 83/473 |
| 2005/0262983 A1 | 12/2005 | Hetcher et al. | |
| 2010/0269659 A1 | 10/2010 | Lawlor | |

FOREIGN PATENT DOCUMENTS

| | | |
|---|---|---|
| EP | 1632324 A1 | 3/2006 |
| EP | 1716986 A1 | 11/2006 |

OTHER PUBLICATIONS

International Search Report and Written Opinion in corresponding PCT Application (i.e., PCT/US2011/064296), completed Feb. 28, 2012, 11 pages.
Festool GmbH, KS 120 EB Miter Saw Original Operating Manual/Spare Parts List, available at least as early as Dec. 22, 2010 (22 pages).
Ridgid Professional Tools, MS1290 Miter Saw, three (3) photographs, available at least as early as Dec. 22, 2010 (3 pages).

(Continued)

*Primary Examiner* — Ghassem Alie
(74) *Attorney, Agent, or Firm* — Maginot Moore & Beck LLP (57) ABSTRACT

The miter saw includes a base and a turntable. The turntable is rotatable in relation to the base. The turntable has a work piece support surface. The miter saw further includes a clamp structure secured in fixed relation to the turntable. The miter saw further includes a bevel arm pivotably connected to the turntable and a cutting arm pivotably connected to the bevel arm. The miter saw also includes a cutting assembly supported by the cutting arm. Further still the miter saw includes a clamp member movable in relation to the bevel arm between a first clamp member position and a second clamp member position. The clamp member includes a follower surface and a brake surface. The miter saw also includes an actuator including a cam surface. The actuator is (i) supported by the bevel arm, and (ii) movable in relation to the bevel arm in a linear path of movement between a first actuator position and a second actuator position.

20 Claims, 6 Drawing Sheets

(56) References Cited

OTHER PUBLICATIONS

Ridgid Professional Tools, Operator's Manual for R4121 12 in. Compound Miter Saw with Adjustable Laser, May 8, 2007 (38 pages).

Ridgid Professional Tools, Operator's Manual for MS1290LZA 12 in. Sliding Compound Miter Saw with Laser, Aug. 16, 2007 (40 pags).

Milwaukee Electric Tool Corporation, Service Parts List for 6950-20 12" Dual Bevel Compound Miter Saw, Aug. 2008 (6 pages).

* cited by examiner

MITER SAW WITH BEVEL LOCK

FIELD OF THE INVENTION

The present disclosure relates generally to miter saws, and particularly to bevel locks for miter saws.

BACKGROUND

Miter saws are used for sawing material, for example, construction lumber. The typical miter saw includes a base or a platform on which a turntable is positioned. The turntable is used to support a work piece to be cut by the miter saw. A support assembly of the miter saw is connected to the turntable and functions to support a cutting assembly that is operable to perform a cutting operation on the work piece. The support assembly includes components that enable the cutting assembly to move upward and downward in relation to the turntable in order to cut the work piece. The support assembly also typically includes components to enable the cutting assembly to pivot in relation to the turntable in order to produce beveled or angled cuts on the work piece.

The cutting assembly of the miter saw is relatively heavy because it includes a motor, a cutting blade, a blade guard, and other structural components such as those components used to maintain a precise path for the cutting blade. When the support assembly is pivoted to change the bevel angle of the cut, the user must temporarily disengage a bevel lock that prevents pivoting of the support assembly relative to the turntable. Once the bevel lock is disengaged, the user pivots the support assembly to position the cutting assembly at a desired cut angle and then engages the bevel lock to prevent further pivoting of the support assembly. This action of engaging and disengaging the bevel lock of the support assembly requires the application of relatively high forces that may be difficult for some users to manage. Accordingly, it would be desirable to provide a miter saw with an improved bevel lock that makes pivoting of the support assembly and the related cutting assembly easier for the user, including easier disengagement and reengagement of the bevel lock.

SUMMARY

According to one embodiment of the present disclosure there is provided a miter saw. The miter saw includes a base and a turntable. The turntable is rotatable in relation to the base. The turntable has a work piece support surface. The miter saw further includes a clamp structure secured in fixed relation to the turntable. The miter saw further includes a bevel arm pivotably connected to the turntable and a cutting arm pivotably connected to the bevel arm. The miter saw also includes a cutting assembly supported by the cutting arm. Further still the miter saw includes a clamp member movable in relation to the bevel arm between a first clamp member position and a second clamp member position. The clamp member includes a follower surface and a brake surface. The miter saw also includes an actuator including a cam surface. The actuator is (i) supported by the bevel arm, and (ii) movable in relation to the bevel arm in a linear path of movement between a first actuator position and a second actuator position. Movement of the actuator from the first actuator position to the second actuator position causes the cam surface to interact with the follower surface so that the clamp member is moved from the first clamp member position to the second clamp member position. Movement of the clamp member from the first clamp member position to the second clamp member position causes the brake surface to be urged against the clamp structure whereby movement of the bevel arm in relation to the turntable is inhibited.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

Figure 1:
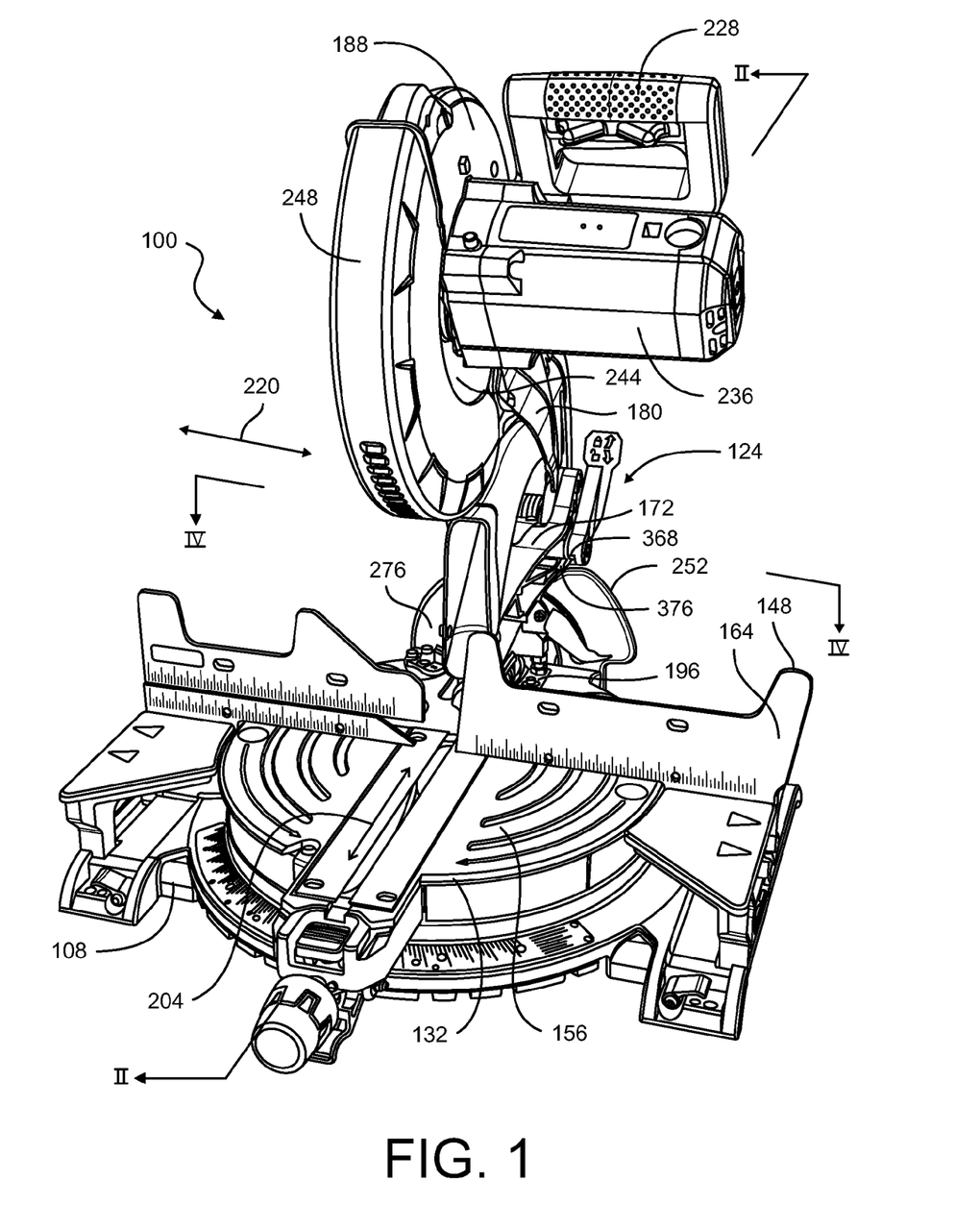
FIG. 1 is a front perspective view of a miter saw having a bevel lock.

FIG. 1 shows a miter saw 100, which includes a base 108, a turntable 132, a bevel arm 172, a cutting arm 180, a cutting assembly 188, and a bevel lock 124. The turntable 132 is rotatably supported on the base 108. An upper surface of the turntable 132 defines a work piece support surface 156 on which a user may position a work piece to be cut by the miter saw 100. A guide fence 148 is connected to the base 108 and defines a workpiece guide surface 164 that is perpendicular to the work piece support surface 156. The turntable 132 may be rotated relative to the base 108 and the guide fence 148 to position the cutting assembly 188 (which is connected to the turntable) in a position that enables the miter saw 100 to perform mitered cutting operations on the work piece.

Figure 2:
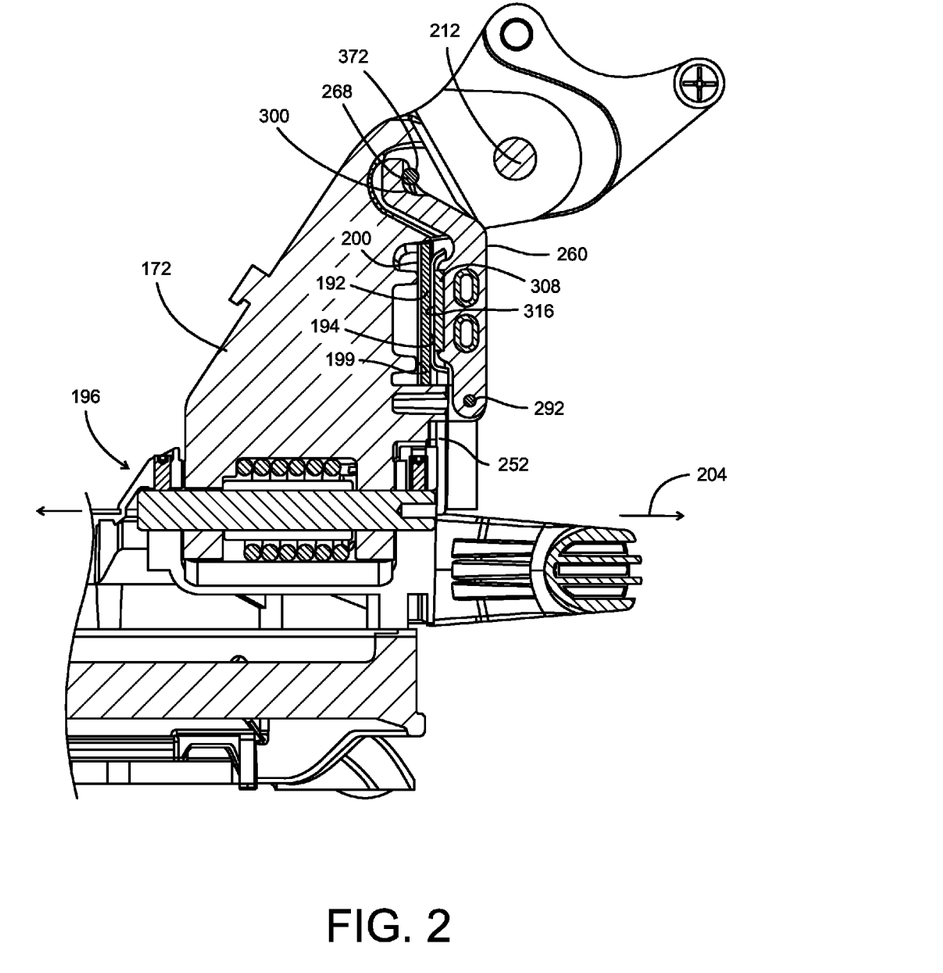
FIG. 2 is a cross sectional view of a portion of the miter saw taken along the line II-II of FIG. 1, with various components being removed from clarity of viewing.

The bevel arm 172 is pivotally connected to a rear portion of the turntable 132 by a hinge unit 196 (also shown in FIG. 2). The hinge unit 196 enables the bevel arm 172 to pivot about a pivot axis 204 relative to the turntable 132 between a vertical position (shown in FIG. 1) and a position of maximum bevel (not shown). In the vertical position, a cutting path of the cutting assembly 188 is positioned approximately perpendicularly to the support surface 156. In the position of maximum bevel the cutting path of the cutting assembly 188 may be positioned 45° or less from the support surface 156. The cutting path of the cutting assembly 188 is defined by the angle of a kerf cut into a work piece supported on the work piece support surface 156 in relation to the work piece support surface.

The cutting arm 180 is pivotally connected to the bevel arm 172 by the pivot shaft 212 (FIG. 2). The cutting arm 180 is configured to pivot relative to the bevel arm 172 about a pivot axis 220, which is substantially perpendicular to the pivot axis 204. A handle 228 is connected to the cutting arm 180 to assist in pivoting the cutting arm and the bevel arm 172.

The cutting assembly 188 is supported by the cutting arm 180 and includes a motor 236, a blade 244, and a blade cover 248. The motor 236 rotates the blade 244 when the motor is connected to a source electrical power. The blade 244 is a generally circular saw blade. The blade cover 248 covers a portion of the blade 244 when the blade is not being used to cut a work piece.

As shown in FIG. 2, the bevel arm 172 further includes a brake pad 192. The brake pad 192 defines a high friction brake surface 194. The brake pad 192 is formed from a composite material that is similar to the material used for automotive brake pads. The bevel arm 172 includes a support plate 200, and the brake pad 192 is connected to the support plate. In another embodiment, the support plate 200 is omitted and the brake pad 192 is connected directly to a surface 199 of the bevel arm 172. In yet another embodiment, the brake pad 192 rests on the support plate 200, but is not connected to the support plate.

Figure 3:
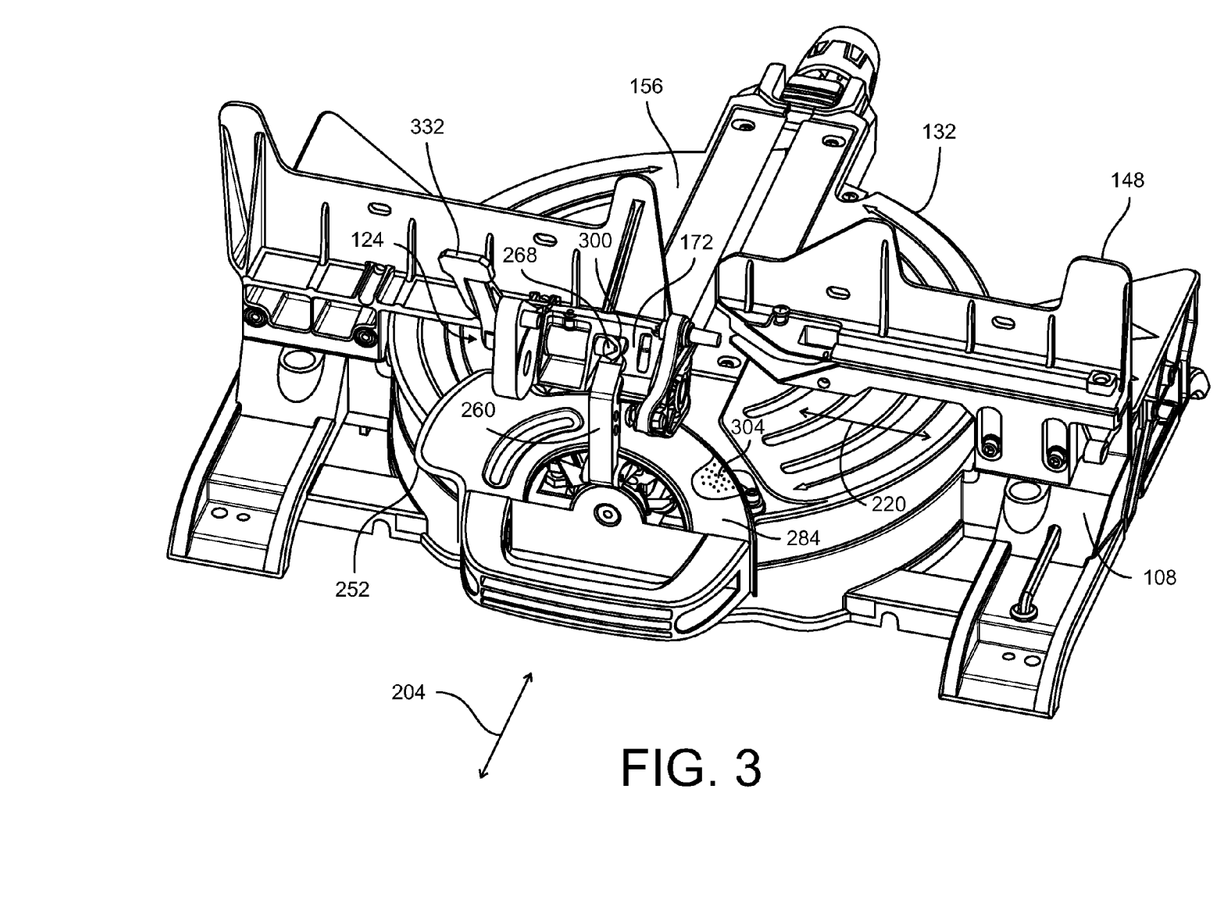
FIG. 3 is a rear perspective view of the miter saw, with various components removed for clarity of viewing.

As shown in FIG. 3, the bevel lock 124 enables a user to easily and quickly secure the cutting assembly 188 (not shown in FIG. 3) at a particular angular position relative to the turntable 132, such that the miter saw 100 may perform beveled work piece cutting operations. The bevel lock 124 includes a clamp structure 252, a clamp member 260, and an actuator 268. The clamp structure 252 includes an arcuate member secured in fixed relation to the turntable 132. In particular, the clamp structure 252 is connected to the rear portion of the turntable 132 near a rear side of the bevel arm 172. The clamp structure 252 may be made from steel, aluminum, or any other rigid material(s). The clamp structure 252 defines a first clamp surface 276 (FIG. 1) and a second clamp surface 284 (FIG. 3). In another embodiment, the clamp structure 252 is formed into the turntable 132, such that the clamp structure and the turntable are a continuous (i.e. "one-piece") structure.

The first and the second clamp surfaces 276, 284 have a textured surface, such as a sandblasted texture (see sandblasted surface 304), to increase the coefficient of friction of the clamp surfaces. In another embodiment, the first and the second clamp surfaces 276, 284 have a knurled textured to increase the coefficient of friction of the clamp surfaces. In yet another embodiment, the first and the second clamp surfaces 276, 284 are chemically etched to increase the coefficient of friction of the clamp surfaces. In another embodiment, the first and the second clamp surfaces 276, 284 do not have a textured surface.

With reference again to FIG. 2, the clamp member 260 includes a clamp arm that is pivotally connected to the bevel arm 172 by a pivot shaft 292. The clamp member 260 is pivotable between a bevel lock position and a bevel unlock position. In the bevel lock position, the clamp member 260 prevents the bevel arm 172 from moving about the pivot axis 204. In the bevel unlock position, the bevel arm is able to move about the pivot axis. The clamp member 260 pivots approximately 0.1° to 10° as it moves from the bevel unlocked position to the bevel locked position and vice versa. The clamp member 260 may be made from steel, aluminum, or any other rigid material(s). In one particular embodiment, a powdered metal fabrication process is used to form the clamp member 260. In the powdered metal fabrication process, a powdered metal material is fused together with heat and pressure to form the clamp member 260.

The clamp member 260 defines a follower surface 300, which in turn defines an indentation in an end portion of the clamp member 260. The follower surface 300 is positioned on the end portion of the clamp member 260 opposite of the pivot shaft 292 and is configured to interface with a portion of the actuator 268. The indentation in the end portion of the clamp member 260 is also referred to as a void.

The clamp member 260 includes a brake pad 308, which defines a brake surface 316. The brake pad 308 is formed from a composite material, similar to the material used for automotive brake pads; accordingly, the brake surface 316 is a high friction surface. The brake surface 316 has a configuration that corresponds to the configuration of the clamp surface 284 (FIG. 3), such that at least a portion of the brake surface 316 may be positioned in contact with the clamp surface 284. Similarly, the brake surface 194 has a configuration that corresponds to the configuration of the clamp surface 276 (FIG. 1), such that at least a portion of the brake surface 194 may be positioned in contact with the clamp surface 276. The brake surfaces 194, 316 and the clamp surfaces 276, 284 have a generally flat configuration.

Figure 4:
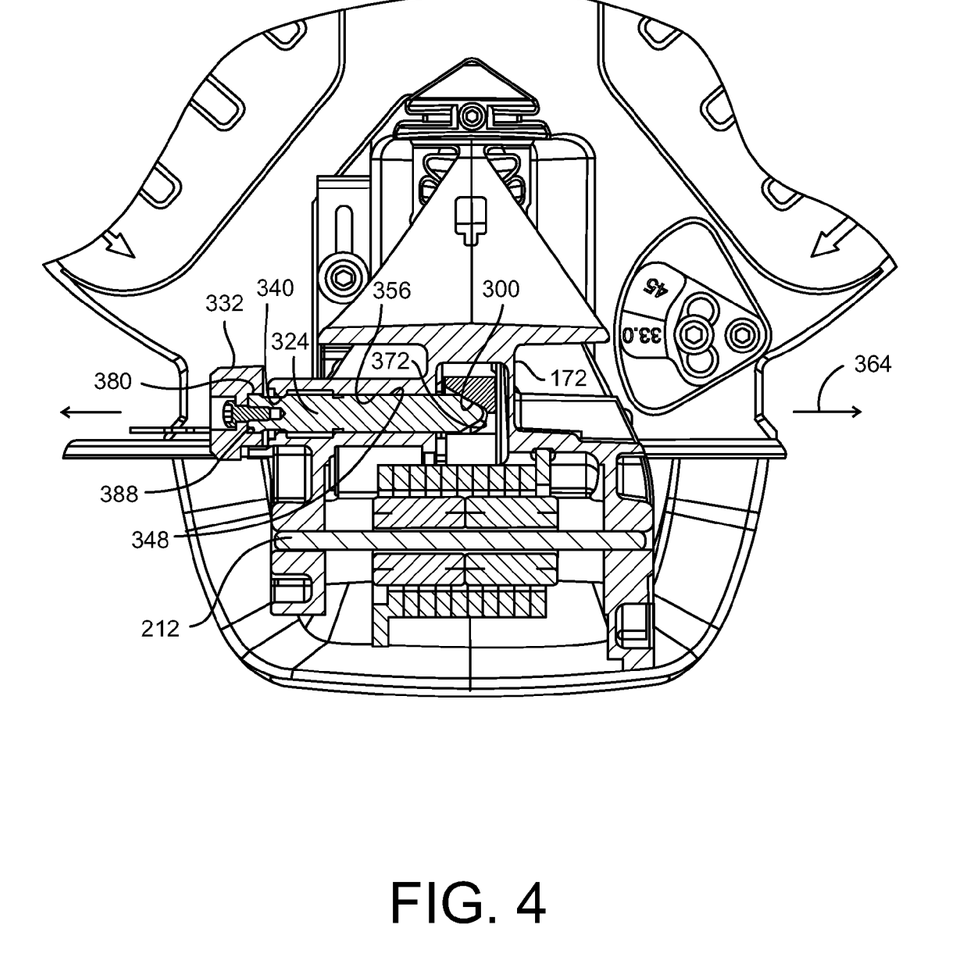
FIG. 4 is a top view, partially in cross-section, of the miter saw taken along the line IV-IV of FIG. 1, with various components removed for clarity of viewing and with the bevel lock in a locked position.
Figure 5:
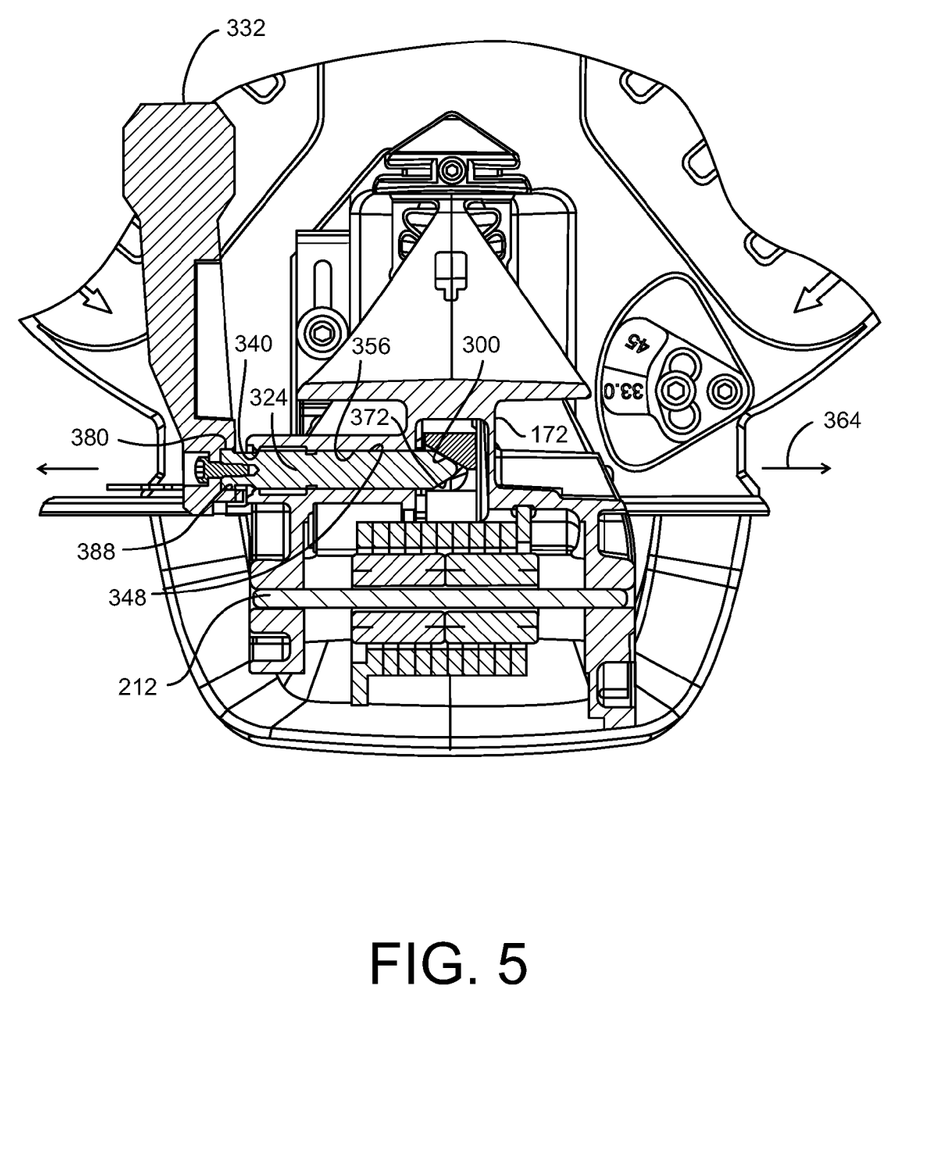
FIG. 5 is a top view, partially in cross-section, of the miter saw taken along the line IV-IV of FIG. 1, with various components removed for clarity of viewing and with the bevel lock in an unlocked position.

The actuator 268, as shown in FIG. 3, is configured to position the clamp member 260 in either the bevel locked position (see FIG. 4) or the bevel unlocked position (see FIG. 5). As shown in FIG. 4, the actuator 268 is supported by the bevel arm 172 and includes a shaft 324 and a handle 332. The shaft 324 is positioned within a bore structure 340 of the bevel arm 172 and may be made from steel, aluminum, or any other rigid material(s). At least a portion of the shaft 324 includes external drive threads 348, which are configured to meshingly engage internal drive threads 356 that are defined by the bore structure 340. Rotation of the shaft 324 causes movement of the shaft along a linear path of movement 364 between a clamped position and an unclamped position. Movement of the shaft 324 to the right in the linear path 364 causes the shaft to move toward a clamped position (as shown in FIG. 4), and movement of the shaft to the left in the linear path 364 causes the shaft to move toward an unclamped position (as shown in FIG. 5). When the shaft 324 is in the clamped position, the clamp member 260 is in the bevel locked position. When the shaft is in the unclamped position, the clamp member is in the bevel unlocked position.

The shaft 324 includes a cam surface 372, which is formed on the end portion of the shaft nearest to the clamp member 260. The cam surface 372 includes a substantially conical surface that is configured to interface with the follower surface 300. Also, the cam surface 372 rotates in response to the rotation of the shaft 324. The shaft 324 further includes a plurality of splines 380 formed on an opposite end portion of the shaft near the handle 332.

The handle 332 is connected to the shaft 324 and includes a plurality of splines 388, a handle stop 368, and a second handle stop (not shown). The splines 388 are configured to intermesh with the splines 380 formed on the shaft. When the splines 380, 388 are intermeshed, rotation of the handle 332 causes rotation of the shaft 324 and the cam surface 372. The splines 380, 388 enable the handle 332 to be connected to the shaft 324 in any one of numerous rotational positions relative to the shaft and the bevel arm 172. Typically, a rotational position of the handle 332 is selected that positions the handle 332 at an angular orientation with respect to its rotational axis (see, e.g., linear path 364) that is convenient for the user.

The extent to which the handle 332 may be rotated relative to the bevel arm 172 (referred to as the handle sweep) is determined at least in part by the distance between the handle stop 368 and the second handle stop and the dimensions of a protrusion 376 connected to the bevel arm 172. The protrusion 376 is positioned between the handle stop 368 and the second handle stop. The handle sweep begins with the handle stop 368 in contact with the protrusion 376, and the handle sweep ends with the second handle stop in contact with the protrusion. The handle sweep enables the handle 332 to rotate relative to the bevel arm 172 by an amount that is sufficient to move the clamp member 260 into the bevel locked position and into the bevel unlocked position.

In operation, the miter saw 100 is used to perform cutting operations, and in particular beveled cutting operations. To position the blade 244 to make cuts in a work piece at a particular bevel angle, the user manipulates the bevel lock 124 so as to place it in a locked position, as shown in FIG. 4. In the locked position the bevel lock 124 fixes the position of the cutting assembly 188 (i.e. the bevel angle of the blade 244) relative to the turntable 108. To adjust the position of the cutting assembly 188 such that a different bevel angle may be selected, the user manipulates the bevel lock 124 so as to place it in an unlocked position. In the unlocked position, as shown in FIG. 5, the bevel lock 124 enables the cutting assembly 188 to be moved by a user relative to the turntable 132 about the pivot axis 204.

To place the bevel lock 124 in the locked position, the handle 332 is rotated in a locked direction (e.g. clockwise). Such rotation of the handle 332 in the locked direction rotates the shaft 324 and causes the shaft to move toward the clamp member 260. As the shaft 324 moves toward the clamp member 260, the cam surface 372 interacts with the follower surface 300 so as to urge the clamp member to move in relation to the bevel arm 172 from the bevel unlocked position to the bevel locked position. In particular, the cam surface 372 and the follower surface 300 operate to transfer the linear movement of the shaft 324 into a pivotal movement of the clamp member 260. During this transfer of movement, the conical cam surface 372 is received by and rotates relative to the void defined by the follower surface 300. The clamp member 260 arrives at the bevel locked position when the shaft 324 arrives at the clamped position.

As shown in FIGS. 2 and 3, the clamp structure 252 is interposed between the brake surface 194 and the brake surface 316. Moving the clamp member 260 to the bevel locked position causes the brake surface 316 to be urged against the clamp surface 284, and also causes the brake surface 194 to be urged against the clamp surface 252. In response to the clamp member 260 being pressed against the clamp structure 252 so that the clamp member 260 is clamped between the brake surfaces 194, 316, movement of the bevel arm 172 in relation to the turntable 132 is inhibited. Specifically, the high friction surfaces of the brake surfaces 194, 316 grip the clamp surfaces 276, 284, so as to lock the bevel arm 172 at a particular bevel angle.

To place the bevel lock 124 in the unlocked position, the handle 332 is rotated in an unlocked direction (e.g. counterclockwise), which is opposite of the locked direction. Such rotation of the handle 332 causes the cam surface 372 to move away from the follower surface 300 so as to allow the clamp member 260 to pivot to the bevel unlocked position. As shown in FIG. 5, in the bevel unlocked position the cam surface 372 remains in contact with the follower surface 300; however, the cam surface extends to a lesser extent into the void defined by the follower surface. Alternatively, the cam surface 372 is separated from the follower surface 300 in the bevel unlocked position. In the bevel unlocked position the brake surface 316 is not urged against the clamp structure 252. In the bevel unlocked position, the brake surfaces 194, 316 become separated from their respective clamp surface 276, 284. Alternatively, the brake surfaces 194, 316 lightly rub against their respective clamp surface 276, 284 but fail to generate a sufficient amount of frictional force necessary to appreciably restrict movement of the bevel arm 172. When the bevel lock 124 is in the unlocked position, a user may easily pivot the bevel arm 172 about the pivot axis 204. It should be noted that by configuring the clamp structure 252 to be arcuate, a portion of the clamp structure remains interposed between the brake surface 194 and the brake surface 316 throughout the entire pivotal range of the bevel arm 172.

The handle 332 is rotated between approximately 60° and 150° to move the bevel lock 124 from the locked position to the unlocked position and vice versa. Preferably, the handle is rotated 90° to move the bevel lock from the locked position to the unlocked position and vice versa.

The components of the bevel lock 124 are configured to significantly reduce machine tolerances and to simplify assembly of the bevel lock. In particular, to assemble the bevel lock 124, the clamp member 260 is connected to the bevel arm 172. Next, the shaft 324 is threaded into the bore structure 340 a sufficient distance to enable the cam surface 372 to interface properly with the follower surface 300. The extent to which the shaft 324 is threaded into the bore structure 340 depends on the position of the clamp member 260. Thus, the ability of the design to function effectively at one of various axial positions of the shaft 324 reduces machine tolerances that affect the assembled position of the clamp member 260. Thereafter, the handle 332 is connected to the shaft 324 at an angular orientation with respect to its rotational axis that is convenient for user access. The ability of the design to function effectively at one of various intermeshing relationships between the splines 380, 388 also reduces machine tolerances.

Figure 6:
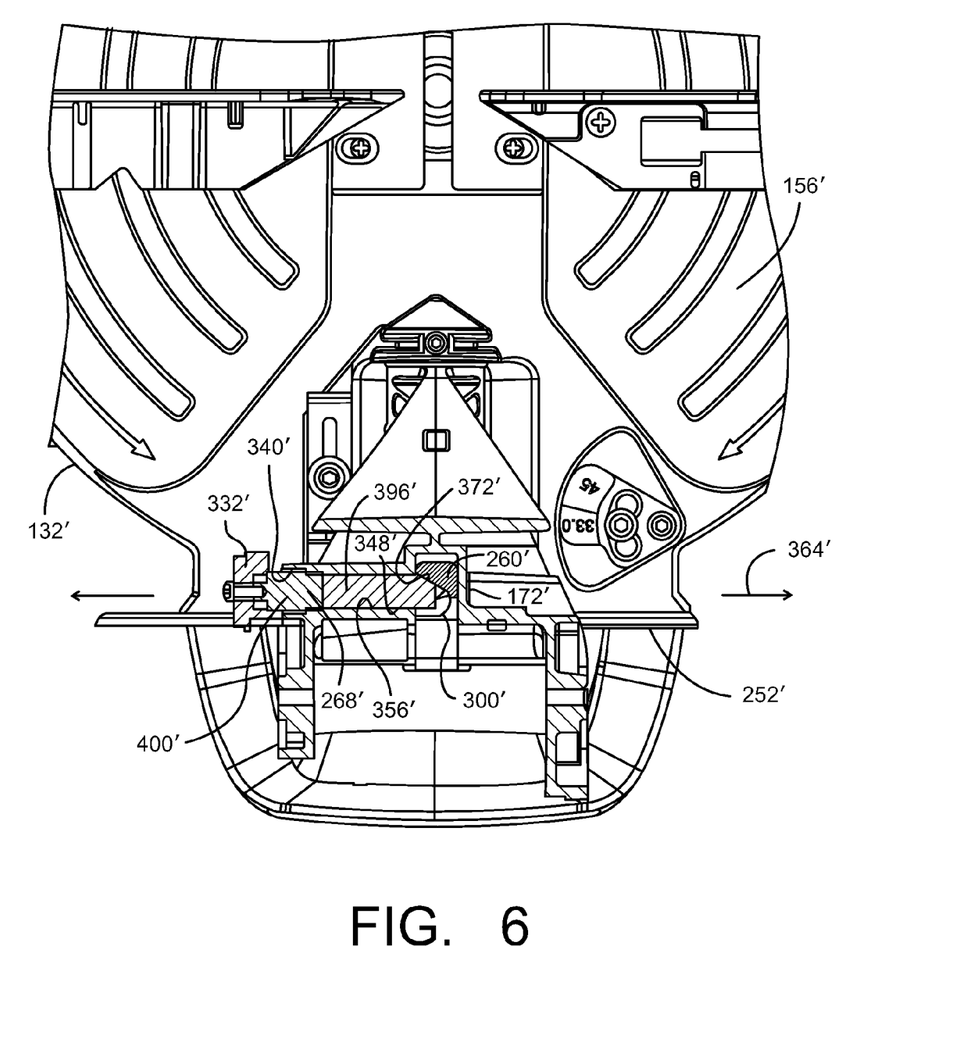
FIG. 6 is a top view, partially in cross-sectional, of the miter saw taken along the line IV-IV of FIG. 1, with various components removed for clarity of viewing and with the miter saw having an alternative embodiment of the bevel lock shown in a locked position.

As shown in FIG. 6, an alternative embodiment of the bevel lock 124' is disclosed. The bevel lock 124' includes the same components, and functions the same way, and is used with the same components of the miter saw 100 in comparison to the bevel lock 124, except that the actuator 268' of the bevel lock 124' includes a slider 396' and a shaft 400'. Additionally, the clamp member 260' includes a follower surface 300'. The shaft 400' includes the external drive threads 348', which are configured to engage the internal drive threads 356' of the bore structure 340'. The handle 332' is connected to the shaft 400', such that rotation the handle causes rotation of the shaft. The slider 396' is positioned within the bore structure 340' and is configured to slide within the bore structure along the linear axis of movement 364'. The cam surface 372' is formed on an end portion of the slider 396' and is an inclined surface relative to the axis of movement 364'. The follower surface 300' is shaped to receive the cam surface 372' and, therefore, defines a corresponding inclined surface. The slider 396' does not rotate in response to rotation of the handle 332' and the shaft 400'. Instead, rotation of the handle 332' and the shaft 400' cause the slider 396' to move along the axis of movement 364' without rotating. Indeed, the shaft 400' is connected to the slider 396' in a manner that allows relative rotation between the shaft and the slider. Thus, movement of the handle 332' in the locked direction (e.g. clockwise direction) causes linear movement of the slider 396' thereby causing the cam surface 372' to interact with the follower surface 300', which in turn causes the clamp member 260' to arrive at the bevel locked position. Movement of the handle 332' in the unlocked direction (e.g. counterclockwise direction) causes the clamp member 260' to arrive at the bevel unlocked position. When the clamp member 260' is in the unlocked position, a user may readily move the bevel arm 172' relative to the clamp structure 252' and the turntable 132'.

What is claimed is:

1. A miter saw, comprising:
a base;
a turntable rotatable in relation to said base and having a work piece support surface;
a clamp structure secured in fixed relation to said turntable;
a bevel arm pivotably connected to said turntable;

a cutting arm pivotably connected to said bevel arm;
a cutting assembly supported by said cutting arm;
a clamp member pivotably connected to said bevel arm and movable in relation to said bevel arm between a first clamp member position and a second clamp member position, said clamp member including a follower surface and a brake surface, wherein said brake surface is disposed between said follower surface and the pivotable connection to said bevel arm; and
an actuator including a cam surface, said actuator being (i) supported by said bevel arm, and (ii) movable in relation to said bevel arm in a linear path of movement between a first actuator position and a second actuator position, wherein movement of said actuator from said first actuator position to said second actuator position causes said cam surface to interact with said follower surface so that said clamp member is moved from said first clamp member position to said second clamp member position, and
wherein movement of said clamp member from said first clamp member position to said second clamp member position causes said brake surface to be urged against said clamp structure whereby movement of said bevel arm in relation to said turntable is inhibited.

2. The miter saw of claim 1, wherein:
said actuator includes a plurality of external drive threads,
said bevel arm includes a bore structure defining a plurality of internal drive threads, and
said plurality of external drive threads are meshingly engaged with said plurality of internal drive threads.

3. The miter saw of claim 1, wherein:
said actuator further includes (i) a handle having a first plurality of splines, and (ii) a shaft having a second plurality of splines, and
when said first plurality of splines are intermeshed with said second plurality of splines, rotation of said handle causes rotation of said shaft.

4. The miter saw of claim 3, wherein:
said bevel arm includes a bore structure,
said actuator further includes a slider positioned within said bore structure, and
said cam surface is formed on said slider.

5. The miter saw of claim 4, wherein said slider moves along said linear path of movement without rotating in response to rotation of said shaft.

6. The miter saw of claim 1, wherein:
said clamp member includes (i) a clamp arm, and (ii) a first brake pad secured to said clamp arm, and
said first brake pad defines said brake surface.

7. The miter saw of claim 6, wherein:
said bevel arm includes a second brake pad, and
movement of said clamp member from said first clamp member position to said second clamp member position causes said clamp structure to be clamped between said first brake pad and said second brake pad.

8. The miter saw of claim 1, wherein:
said bevel arm is configured to pivot in relation to said turntable about a first axis,
said cutting arm is configured to pivot in relation to said bevel arm about a second axis, and
said first axis is substantially perpendicular to said second axis.

9. The miter saw of claim 1, wherein:
said clamp structure includes an arcuate member connected to said turntable, and
said arcuate member is interposed between said brake surface and said bevel arm.

10. The miter saw of claim 9, wherein movement of said clamp member from said first clamp member position to said second clamp member position causes said brake surface to be urged against said arcuate member.

11. The miter saw of claim 10, wherein:
said arcuate member includes a textured surface, and
movement of said clamp member from said first clamp member position to said second clamp member position causes said brake surface to be urged against said textured surface.

12. The miter saw of claim 1, wherein said clamp member includes a powdered metal component.

13. The miter saw of claim 1, wherein said actuator moves between said first actuator position and said second actuator position in response to being rotated approximately ninety degrees.

14. The miter saw of claim 1, wherein:
said clamp member defines a first end portion and an opposite second end portion,
a pivot shaft extends through said first end portion to pivotably connect said clamp member to said bevel arm, and
said follower surface is defined by said second end portion of said clamp member.

15. A miter saw, comprising:
a base;
a turntable rotatable in relation to said base and having a work piece support surface;
a clamp structure secured in fixed relation to said turntable;
a bevel arm pivotably connected to said turntable;
a cutting arm pivotably connected to said bevel arm;
a cutting assembly supported by said cutting arm;
a clamp member movable in relation to said bevel arm between a first clamp member position and a second clamp member position, said clamp member including a follower surface and a brake surface; and
an actuator including a cam surface, said actuator being (i) supported by said bevel arm, and (ii) movable in relation to said bevel arm in a linear path of movement between a first actuator position and a second actuator position, wherein movement of said actuator from said first actuator position to said second actuator position causes said cam surface to interact with said follower surface so that said clamp member is moved from said first clamp member position to said second clamp member position, wherein movement of said clamp member from said first clamp member position to said second clamp member position causes said brake surface to be urged against said clamp structure whereby movement of said bevel arm in relation to said turntable is inhibited, and
wherein said cam surface includes a substantially conical surface movable in said linear path and configured to rotate relative to said clamp member.

16. The miter saw of claim 15, wherein said clamp member is pivotably connected to said bevel arm.

17. The miter saw of claim 15, wherein said cam surface interacting with said follower surface includes transferring linear movement of said cam surface into pivotal movement of said clamp member.

18. The miter saw of claim 17, wherein said cam surface interacting with said follower surface further includes rotating said cam surface against said follower surface.

19. The miter saw of claim 15, wherein said cam surface is positioned against said follower surface.

20. The miter saw of claim 15, wherein said cam surface at least partially fills a void defined by the follower surface.

* * * * *